US009798755B2

(12) United States Patent
Goodnight et al.

(10) Patent No.: US 9,798,755 B2
(45) Date of Patent: Oct. 24, 2017

(54) SYSTEMS AND METHODS FOR GENERATING A CROSS-PRODUCT MATRIX IN A SINGLE PASS THROUGH DATA USING SINGLE PASS LEVELIZATION

(71) Applicant: SAS Institute Inc., Cary, NC (US)

(72) Inventors: James Howard Goodnight, Cary, NC (US); Oliver Schabenberger, Cary, NC (US)

(73) Assignee: SAS Institute Inc., Cary, NC (US)

( * ) Notice: Subject to any disclaimer, the term of this patent is extended or adjusted under 35 U.S.C. 154(b) by 359 days.

(21) Appl. No.: 14/620,892

(22) Filed: Feb. 12, 2015

(65) Prior Publication Data

US 2015/0154238 A1 Jun. 4, 2015

Related U.S. Application Data

(63) Continuation of application No. 12/972,840, filed on Dec. 20, 2010, now Pat. No. 8,996,518.

(51) Int. Cl.
*G06F 17/30* (2006.01)
*G06F 17/16* (2006.01)

(52) U.S. Cl.
CPC ........ *G06F 17/30327* (2013.01); *G06F 17/16* (2013.01); *G06F 17/30289* (2013.01); *G06F 17/30324* (2013.01)

(58) Field of Classification Search
CPC .......................... G06F 17/16; G06F 17/30327
See application file for complete search history.

(56) References Cited

U.S. PATENT DOCUMENTS 6,708,163 B1  3/2004  Kargupta et al.
6,795,815 B2  9/2004  Zhang
8,046,797 B2  10/2011  Bentolila et al.
(Continued)

FOREIGN PATENT DOCUMENTS

CA        2818905 A1     6/2012
WO   2003/048961 A1     6/2003
(Continued)

OTHER PUBLICATIONS

Office Action dated Aug. 5, 2014 for Canadian Patent Application No. 2,818,905, 3 pages.
(Continued)

*Primary Examiner* — Yuqing Xiao
(74) *Attorney, Agent, or Firm* — Kilpatrick Townsend & Stockton LLP

(57) ABSTRACT

A data processing system having multiple executable threads is configured to generate a cross-product matrix in a single pass through data. An example system comprises memory for receiving the data, a processor having a plurality of executable threads, and software code for generating a cross-product matrix in a single pass through the data. The software code includes threaded variable levelization code for generating thread specific binary trees for classification variables, variable tree merge code for combining the thread-specific trees into overall trees for the classification variables, effect levelization code for generating sub-matrices of the cross-product matrix using the overall trees for the classification variables, and cross-product matrix generation code for generating the cross-product matrix by storing and ordering the elements of the sub-matrices in contiguous memory space.

39 Claims, 16 Drawing Sheets

(56) References Cited

U.S. PATENT DOCUMENTS

| | | |
|---|---|---|
| 8,180,177 B1 | 5/2012 | Intwala |
| 8,380,778 B1 | 2/2013 | Bell et al. |
| 8,996,518 B2 | 3/2015 | Schabenberger et al. |
| 2007/0100961 A1 | 5/2007 | Moore |
| 2007/0118839 A1 | 5/2007 | Berstis et al. |
| 2009/0049435 A1 | 2/2009 | Luszczek et al. |
| 2010/0094910 A1 | 4/2010 | Bayliss |
| 2010/0110935 A1 | 5/2010 | Tamassia et al. |
| 2012/0159489 A1 | 6/2012 | Schabenberger et al. |

FOREIGN PATENT DOCUMENTS

| | | |
|---|---|---|
| WO | 2009/143073 A1 | 11/2009 |
| WO | 2012/087629 A2 | 6/2012 |

OTHER PUBLICATIONS

Reply to Canadian Patent Office dated Nov. 5, 2014 to the Office Action dated Aug. 5, 2014 for Canadian Patent Application No. 2,818,905, 16 pages.

SAS, "Building the SSCP Matrix", SAS/STAT(R) User's Guide, Second Edition, Apr. 30, 2010, retrieved from URL:http://support.sas.com on Jan. 17, 2013, 10 pages.

Cohen, Robert A., "SAS Meets Big Iron: High Performance Computing in SAS Analytic Procedures", 27th Annual SAS Users Group International Conference, Jan. 1, 2002, 9 pages.

Shafer et al., "SPRINT: A Scalable Parallel Classifier for Data Mining", Proceedings of the 22nd VLDB Conference, Sep. 3, 1996, 12 pages.

Lodi et al., "Single-Pass Distributed Learning of Multi-Class SVMs using Core-Sets", Proceedings of the 10th SIAM International Conference on Data Mining, Apr. 2010, pp. 257-268.

Sargent et al., "The Scalable Performance Data Server: Real World Experiences", Proceedings of 98' Nesug, Oct. 1998, accessed from http://www.nesug.org/proceedings/nesug98/dbas/p006.pdf, pp. 1-6.

Chan et al., "Experiments on multistrategy learning by meta-learning", Nov. 1993, CIKM '93 Proceedings of the second international conference on Information and knowledge management, pp. 314-323.

Van et al., "An Efficient Decision Tree Construction for Large Datasets", Nov. 2007, International Conference on Innovations in Information Technology, pp. 21-25.

Zaki, "SPADE: An Efficient Algorithm for Mining Frequent Sequences", Feb. 2001, Machine Learning, vol. 42, pp. 31-60.

Islam, Nazrul et al., "An Empirical Distributed Matrix Multiplication Algorithm to Reduce Time Complexity", Proceedings of the International MultiConference of Engineers and Computer Scientists 2009 vol. II, IMEC 2009, Mar. 18-20, 2009, Hong Kong, pp. 2171-2173.

Bekas, C. et al., "Low Cost High Performance Uncertainty Quantification", WHPCF '09, Portland, Oregon, 8 pp. (Nov. 15, 2009).

Hesterberg, Timet et al., "Least Angle Regression", abridged version of an SBIR Phase II proposal to NIH, pp. 1-28 (Apr. 3, 2006).

International Search Report and Written Opinion, dated Jul. 4, 2011, for PCT Application No. PCT/US2011/024540, 10 pages.

International Search Report and Written Opinion, dated Jan. 25, 2013, for PCT Application No. PCT/US2011/064340, 10 pages.

Non-Final Office Action dated Apr. 11, 2013 for U.S. Appl. No. 12/972,840, 15 pages.

Final Office Action dated Dec. 27, 2013 for U.S. Appl. No. 12/972,840, 13 pages.

Non-Final Office Action dated Jul. 31, 2014 for U.S. Appl. No. 12/972,840, 13 pages.

Notice of Allowance dated Nov. 21, 2014 for U.S. Appl. No. 12/972,840, 5 pages.

Steinhaeuser et al., "Exploiting Thread-Level Parallelism to Build Decision Trees" Department of Computer Science & Engineering, University of Notre Dame, USA, (2008) https://www3.nd.edu/~nchawla/papers/ECMLO6c.pdf 12 pages.

Marker et al., "Toward Scalable Matrix Multiply on Multithreaded Architectures" Euro-Par, Berlin Heidelberg (2007), LNCS 4641, pp. 748-757.

Communication pursuant to Article 94(3) EPC of May 3, 2017 for EP Patent Application No. 11 808 992.9; 8 pages.

Reply to European Patent Office dated Jan. 26, 2016 to the Office Communication dated Oct. 12, 2016 for EP Patent Application No. 11 808 992.9; 4 pages.

Communication pursuant to Article 94(3) EPC of Oct. 12, 2016 for EP Patent Application No. 11 808 992.9; 6 pages.

Reply to European Patent Office dated Jan. 15, 2014 to the Office Communication dated Jul. 26, 2013 for EP Patent Application No. 11 808 992.9; 10 pages.

SYSTEMS AND METHODS FOR GENERATING A CROSS-PRODUCT MATRIX IN A SINGLE PASS THROUGH DATA USING SINGLE PASS LEVELIZATION

CROSS REFERENCE TO RELATED APPLICATIONS

The present application is a Continuation of U.S. patent application Ser. No. 12/972,840 filed on Dec. 20, 2010 and entitled "Systems and Methods for Generating a Cross-Product Matrix In a Single Pass Through Data Using Single Pass Levelization," which is hereby incorporated by reference in its entirety.

TECHNICAL FIELD

The technology described herein relates generally to data processing systems and more specifically to data processing systems that perform statistical analysis.

BACKGROUND

Cross-product matrices are frequently generated by data processing systems that perform statistical analysis, such as data processing systems that use the method of least squares to fit general linear models to data. In general, one can form a dense cross-product matrix ("X'X matrix") by first forming the x row for the current observation and then adding the outer product to the X'X matrix computed so far. Mathematically, this can be expressed as:

$$X'X = \sum_{i=1}^{n} x_i x_i'$$

where n denotes the number of observations, the matrix X'X is of order (p×p), and the vector $x_i$ is of order (p×1).

Multi-pass algorithms to solve such matrices may be used in such non-limiting situations as when the elements of $x_i$ depend on elements in $x_j$ (where j is different from i). In these types of situations, it is customary to compute the X'X matrix in multiple passes through the data. For example, on a first pass one might compute the information necessary to subsequently construct the vector $x_i$ for any observation and then computes the cross-product matrix on a second pass.

As another non-limiting scenario, multi-pass algorithms are used when the columns of the X matrix depend on classification variables. Classification variables are variables whose raw values are mapped to an integer encoding. For example, a study of a species of fish might include a classification variable for gender with three categories: male, female, and undetermined. If a gender effect is in a statistical model regarding the study (i.e., occupies columns in the X matrix), the knowledge of a number of factors would be required to construct the X matrix. Such factors might include: (i) the number of levels of the gender effect that are represented in the data; (ii) the proper order for these levels; and (iii) the position of the first column of the gender effect in the X matrix—that is, which other terms precede the gender effect in the model and how many columns do they occupy.

Statistical analysis with classification variables in model effects are common in a number of SAS/STAT® procedures such as GLM, GENMOD, GLIMMIX, GLMSELECT, LOGISTIC, MIXED, and PHREG. These procedures construct the rows of X in up to three passes through the data. In the first pass the unique values of the classification variables and their sort order are determined. In a second pass, the levels of the effects in which the classification variables are involved are determined. Finally, in a third pass the row of X (i.e., $x_i$ for the $i^{th}$ observation) is constructed.

SUMMARY

In accordance with the teachings provided herein, systems, methods, and computer-readable storage mediums are provided for a data processing system having multiple executable threads that is configured to generate a cross-product matrix in a single pass through data to be analyzed. An example system comprises memory for receiving the data to be analyzed, one or more processors having a plurality of executable threads for executing code to analyze data, and software code for generating a cross-product matrix in a single pass through data to be analyzed. The software code includes threaded variable levelization code for generating a plurality of thread specific binary trees for a plurality of classification variables, variable tree merge code for combining a plurality of the thread-specific trees into a plurality of overall trees for the plurality of classification variables, effect levelization code for generating a plurality of sub-matrices of the cross-product matrix using the plurality of the overall trees for the plurality of classification variables, and cross-product matrix generation code for generating the cross-product matrix by storing and ordering the elements of the sub-matrices in contiguous memory space.

DETAILED DESCRIPTION

Figure 1:
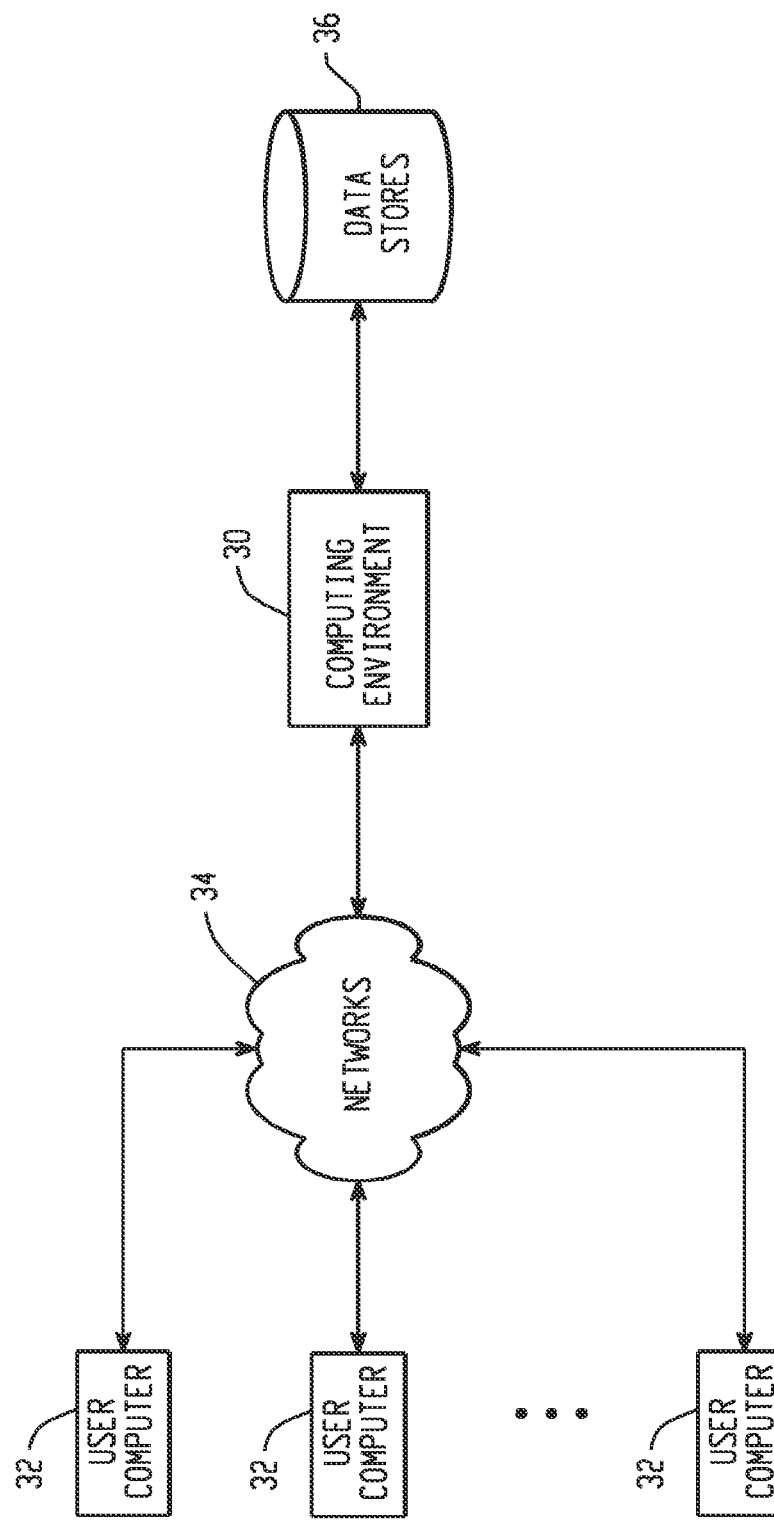
FIG. 1 is a block diagram depicting an example environment wherein users can interact with a computing environment that can perform statistical analysis.

FIG. 1 depicts at 30 a computing environment for processing large amounts of data for many different types of applications, such as for scientific, technical or business applications. One or more user computers 32 can interact with the computing environment 30 through a number of ways, including a network 34. One or more data stores 36 may be coupled to the computing environment 30 to store data to be processed by the computing environment 30 as well as to store any intermediate or final data generated by the computing environment.

An example application for the computing environment 30 involves the performance of statistical analysis. Frequently, in statistical analysis, models for sets of data are generated, and cross-product matrices ("X'X") are generated during the modeling process by the data processing systems in the computing environment 30 that perform statistical analysis. The models involve variables and the effects of those variables reflected in the data.

Effects in the context of X'X formation are linear mathematical structures—that is, an effect is associated with certain columns of the X matrix. Except for specially defined tokens and keywords (like "Intercept"), effects depend on variables. An effect typically includes one or more variables that contribute to the effect.

Two types of variables that impact effects are continuous and classification variables. A continuous variable is a numeric variable and the raw values of the variable are used in constructing the effects. For example, the heights and weights of subjects are continuous variables.

A classification variable is a numeric or character variable whose raw values are used indirectly in forming the effect contribution. The values of a classification variable are called levels. For example, the classification variable Sex has the levels "male" and "female." During the X'X formation, the values of the classification variable are mapped to integer values that represent levels of the variable. The process of mapping the values of the classification variable to a level is referred to herein as variable levelization. These classification levels of the variables are then used to define the levels of the effect. The process of mapping the levels of the effect is referred to herein as effect levelization.

Effects that involve classification variables occupy one or more columns in the X matrix. The exact number of columns for a classification effect depends on the values of the variables involved, on the mapping rules for variable levelization, and on any effect operators.

For a main effect, the levels of the effect are typically the levels of the classification variable, unless all observations associated with a particular level of the variable are not useable in the analysis. For an effect that contains more than one classification variable, the effects of the level depend on the levels of the classification variables that occur together in the data.

Although, in many scenarios, levelization of a variable may be performed without knowing levels or values of other variables, levelization of effects, however, cannot be performed without knowing the levels of all the variables in the effect. Unlike many current data processing systems that implement levelization algorithms that require data to be read multiple times, the computing environment 30 includes a data processing system that can perform variable and effect levelization in a single pass through the data.

Figure 2:
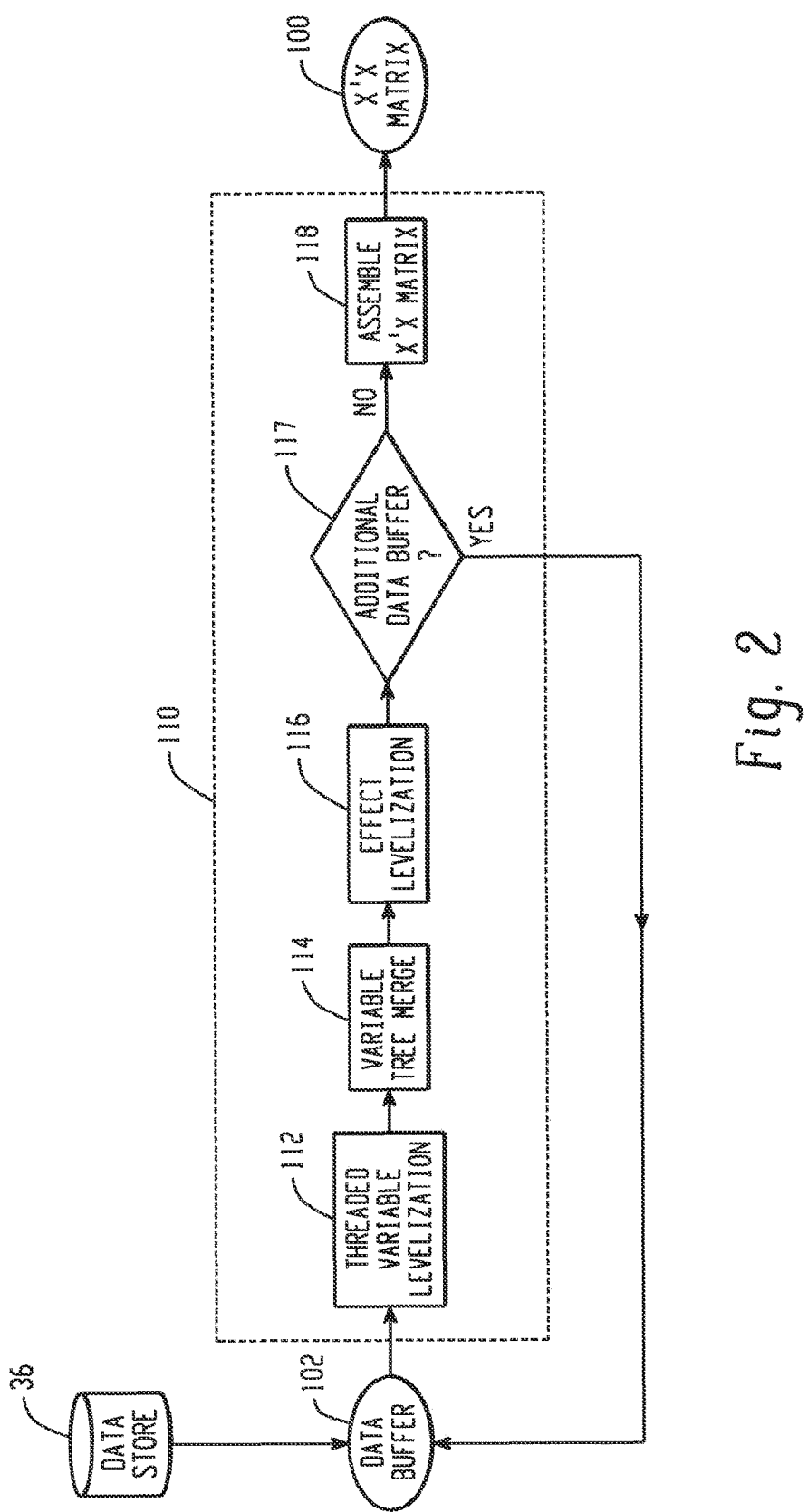
FIGS. 2-4 are block diagrams depicting example hardware and software components of data processing systems for generating a cross-product matrix.

FIG. 2 depicts an example data processing system for constructing an X'X Matrix 100 in a single pass through data that includes classification variable data. The example data processing system includes one or more data processors (not shown) having a number of execution threads that are capable of independently performing data analysis steps, a data buffer 102 for receiving data from a data store 36, and a single pass levelization engine 110. The single pass levelization engine 110 in this example includes a threaded variable levelization software components 112, a variable tree merge software component 114, an effect levelization software component 116, decision instructions 117 and an X'X matrix assembly software component 118.

In operation, the single pass levelization engine 110 can generate an X'X matrix 100 in a single pass through the data in the data buffer 102. After data are read from the data buffer 102, one or more execution threads execute instructions from the threaded variable levelization software component 112. The results generated by the threaded variable levelization software component 112 are provided as input to the variable tree merge software component 114. The results generated from executing the instructions from the variable tree merge software component 114, are in turn provided as input to the effect levelization software component 116. Decision instructions 117 are executed which determine whether additional data to be processed exists in the data buffer 102 before proceeding to assemble an X'X matrix. If additional data exists, data are read from the data buffer 102 and control of the process is returned to the threaded variable levelization software component 112. If no additional data exists, then the results generated from executing the instructions from the effect levelization software component 116 are provided to the X'X matrix assembly software component 118, which assembles an X'X matrix 100.

Figure 3:
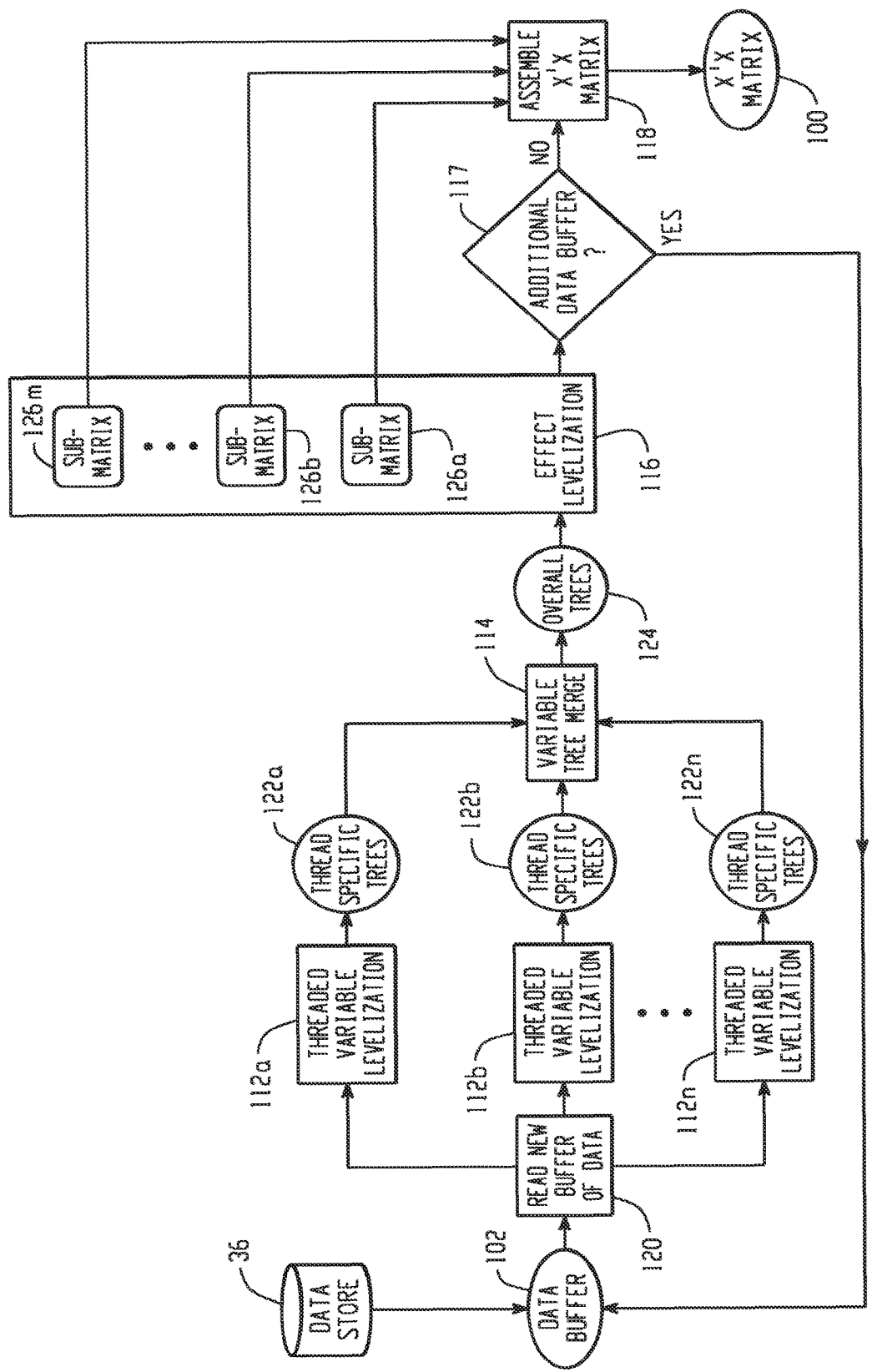

FIG. 3 depicts, in more detail, an example data processing system for constructing an X'X Matrix 100 in a single pass through data that includes classification variable data. This example data processing system also includes a data processor (not shown) having a number of execution threads that are capable of independently performing data analysis steps, a data buffer 102 for receiving data from a data store 36, and a single pass levelization software component 110. The single pass levelization engine 110 in this example includes a plurality of threaded variable levelization software sub-components 112a-112n, a variable tree merge software component 114, an effect levelization software component 116, decision instructions 117 and an X'X matrix assembly software component 118.

In the example of FIG. 3, processor instructions 120 are provided for reading a new buffer of data from the data buffer 102 and inputting that data to the threaded variable levelization software sub-components 112a-112n. Each threaded variable levelization software sub-components is executed by a separate processor executing thread, which results in the generation of thread-specific binary trees 122a-122n that describe characteristics of classification variables found in the data. After generation, these thread-specific binary trees 122a-122n are combined by the variable tree merge software component 114 to generate overall binary trees 124 for each classification variable.

After variable levelization is complete and the overall binary trees 124 for each classification variable are generated, the binary trees 124 are processed by the effect levelization software component 116, which generates partial sub-matrices 126a-126m of the overall cross-product matrix using the overall binary trees 124. Decision instructions 117 are executed which determine whether additional data to be processed exists in the data buffer 102 before proceeding to assemble an X'X matrix. If additional data exists, data are read from the data buffer 102 and control of the process is returned to processor instructions 120. If no additional data exists, then the partial sub-matrices 126a-126m are provided to the X'X matrix assembly software component 118, which assembles an X'X matrix 100.

Figure 4:
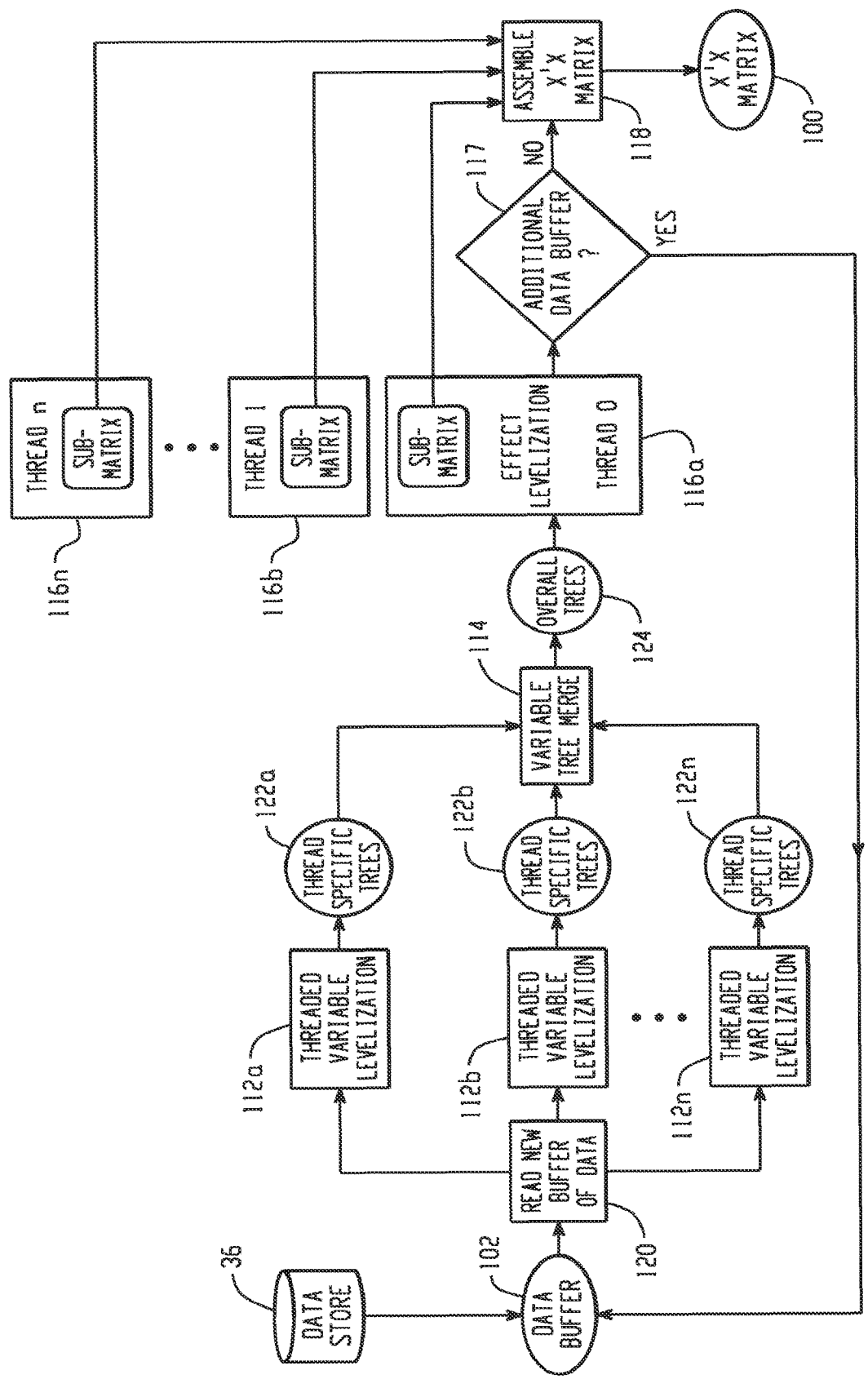

FIG. 4 depicts another example data processing system for constructing an X'X matrix 100 in a single pass through data that includes classification variable data. This example data processing system contains elements similar to the example system depicted in FIG. 3. The example system depicted in FIG. 4, however, includes an effect levelization engine that could be executed by multiple threads. In the example shown, processor execution thread 0 executes the effect levelization software sub-component 116a, processor execution thread 1 executes the effect levelization software sub-component 116b, and processor execution thread n executes the effect levelization software sub-component 116n. Each processor execution thread executes instructions that result in the generation of one or more sub-matrices of the overall X'X matrix.

Figure 5:
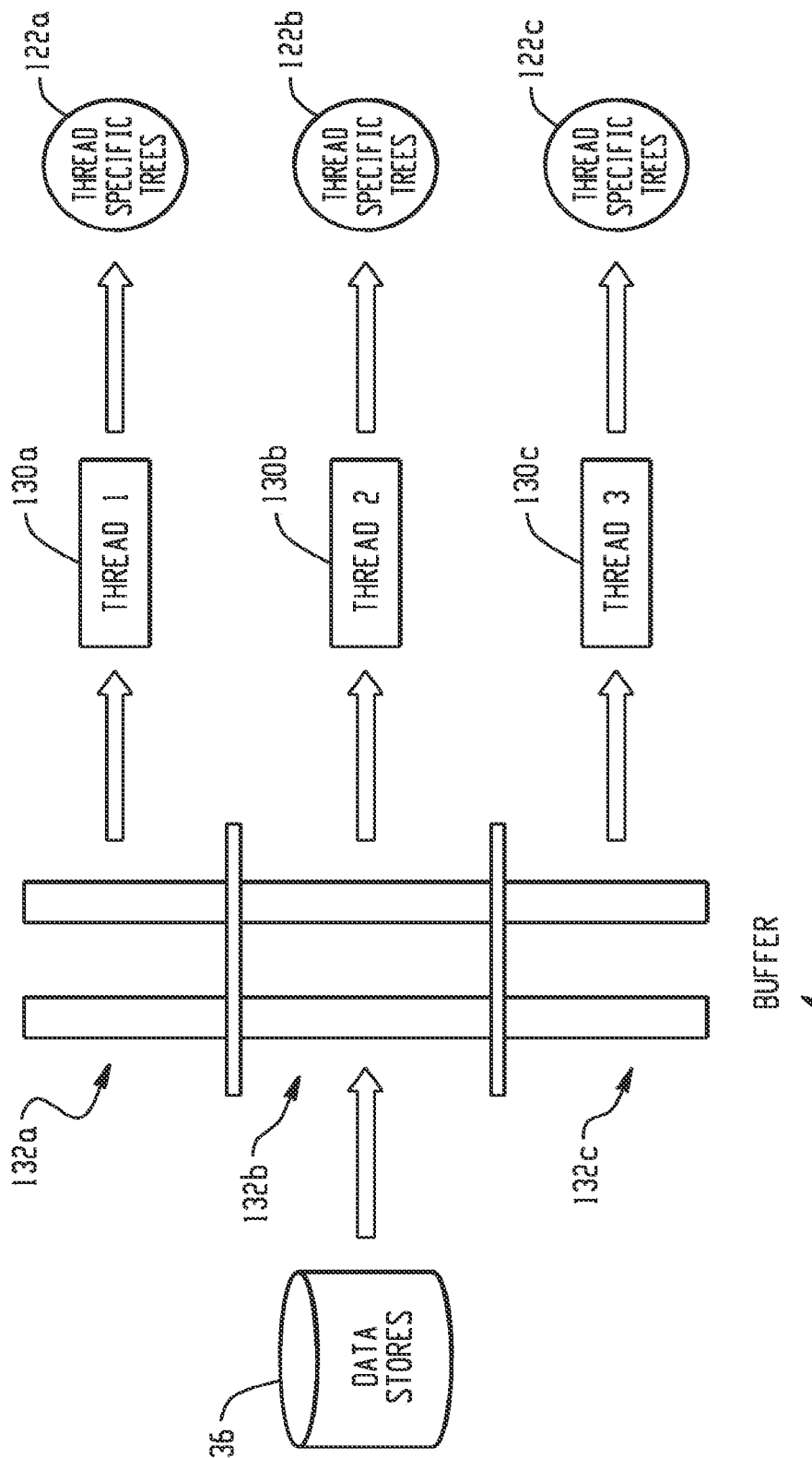
FIG. 5 is a block diagram depicting example hardware components of a data processing system that uses multiple computing threads to perform variable levelization.
Figure 6:
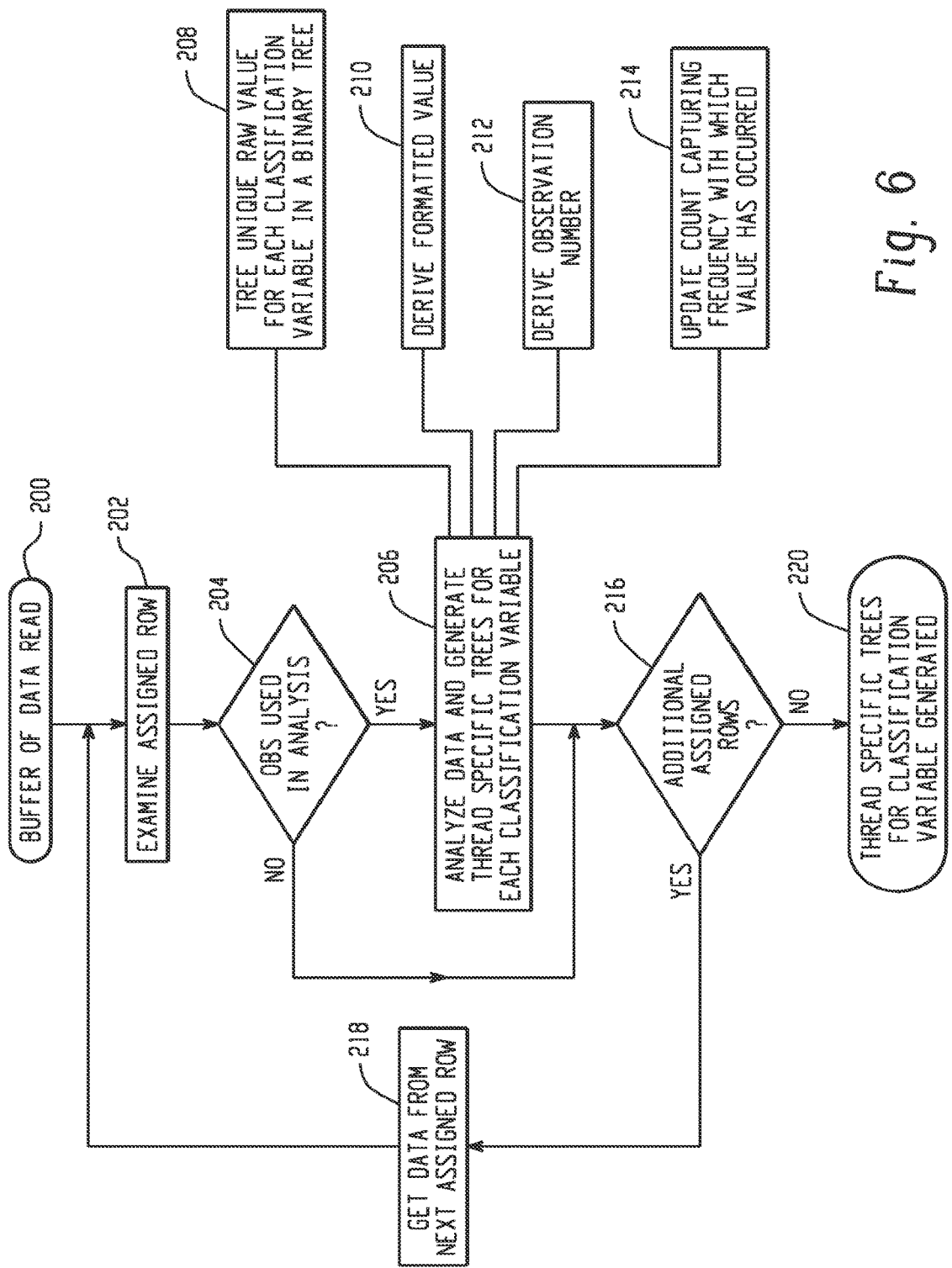
FIG. 6 is a process flow diagram depicting an example operational scenario involving a data processing system for performing variable levelization.

FIG. 5 depicts an example system and FIG. 6 depicts an example process for generating thread specific trees 122a-122c using the threaded variable levelization software component 112 (shown in FIGS. 2-4). The process commences (step 200 in FIG. 6) with a buffer 100 (FIG. 5) of raw data containing k observations being passed to the levelization code. If levelization is conducted in multiple threads, the buffer memory 100 is apportioned to the threads 130a-130c (FIG. 5) in such a way that each thread 130a-130c processes approximately the same number of observations. In this example the levelization is conducted with three threads 130a-130c, and each thread 130a-130c process approximately ⅓ of the observations. This apportioning in this example includes setting each threads' read pointer to the correct position in the buffer 100.

Each thread 130a-130c examines each row in the assigned buffer area 132a-132c (step 202) and determines whether the observation is used for the analysis (step 204). If the observation is to be used, the unique raw values for each variable are treed in a binary tree 122a-122c that also contains auxiliary information on each tree node (step 206). Whenever a new raw value is found (step 208), a formatted value is derived (step 210), the observation number in the overall application is derived (step 212), and the frequency with which the value has occurred is updated (step 214).

Alternatively at step 206, the formatted values are derived for each observation regardless of the raw value. In this alternative example, step 208 is bypassed. Each observation used in the analysis is mapped to a formatted value but a new formatted value is not derived for each unique raw value. This variation is useful when the number of raw values is far greater than the number of formatted values; for example, when a continuous variable is grouped into intervals.

After the assigned row of data has been read and processed, a check is made to determine if additional assigned rows of data exist that have not been processed (step 216). If yes, then the additional row of data is read (step 218) and examined (step 202). If no, then the thread-specific binary trees for each classification variable are complete (step 220).

Figure 7:
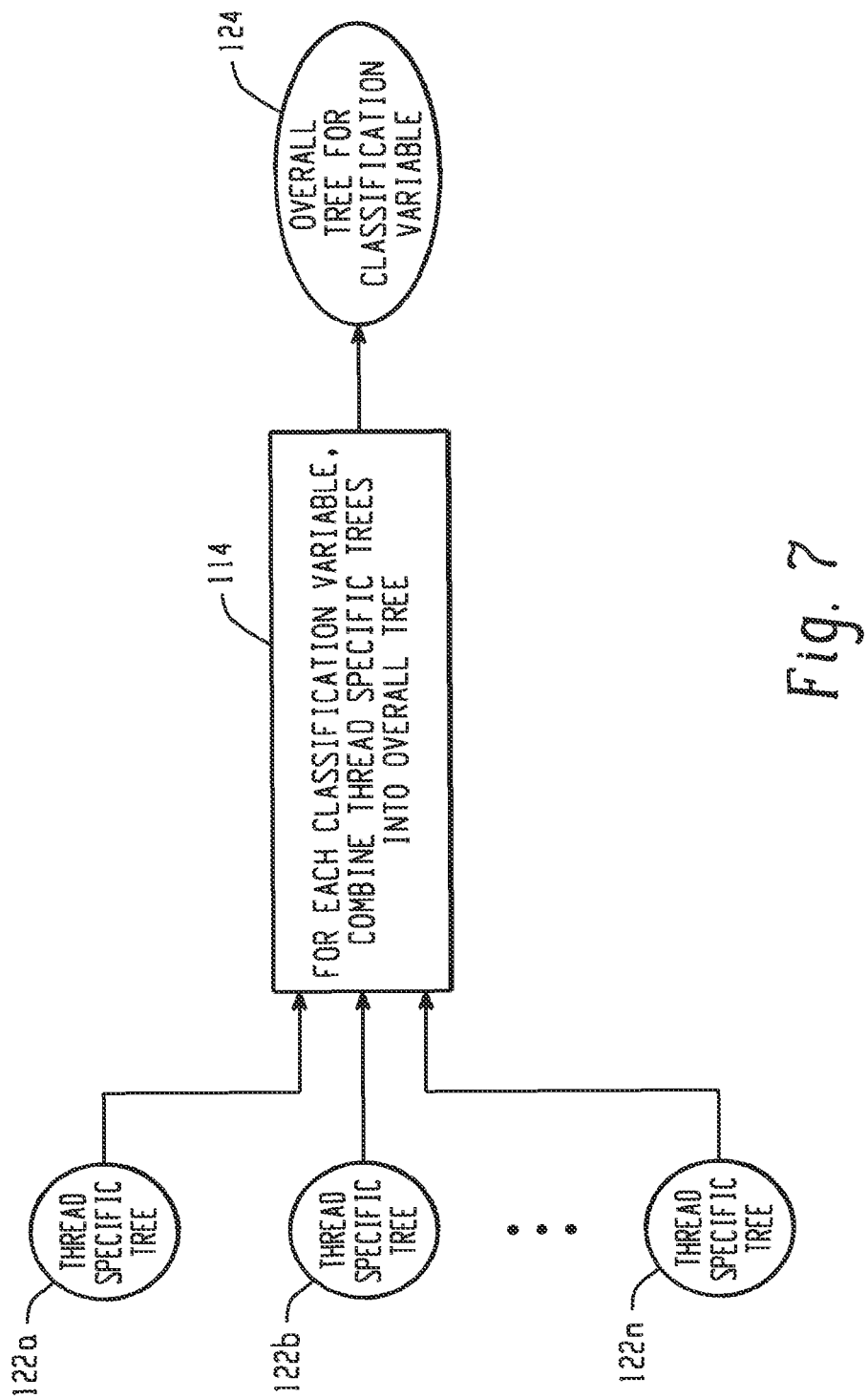
FIG. 7 is a process flow diagram depicting an example operational scenario involving a data processing system for merging analysis performed by multiple computing threads.

FIG. 7 depicts an example process for generating an overall tree 124 for each classification variable using the variable tree merge software component 114. After all of the threads 130a-130c (FIG. 5) have completed treeing the observations in their buffer, the thread-specific trees 122a-122c for each classification variable are combined into an overall tree 124. Multiple ways can be used to accomplish this, such as by accumulating trees in the tree constructed by the first thread.

The overall trees for each classification variable retain information regarding the order in which the raw/formatted values were seen. In this example, for each value of a classification variable, the associated level of the variable corresponds to the data order, i.e., variable levels are organized by the order in which they appear in the data.

Figure 8:
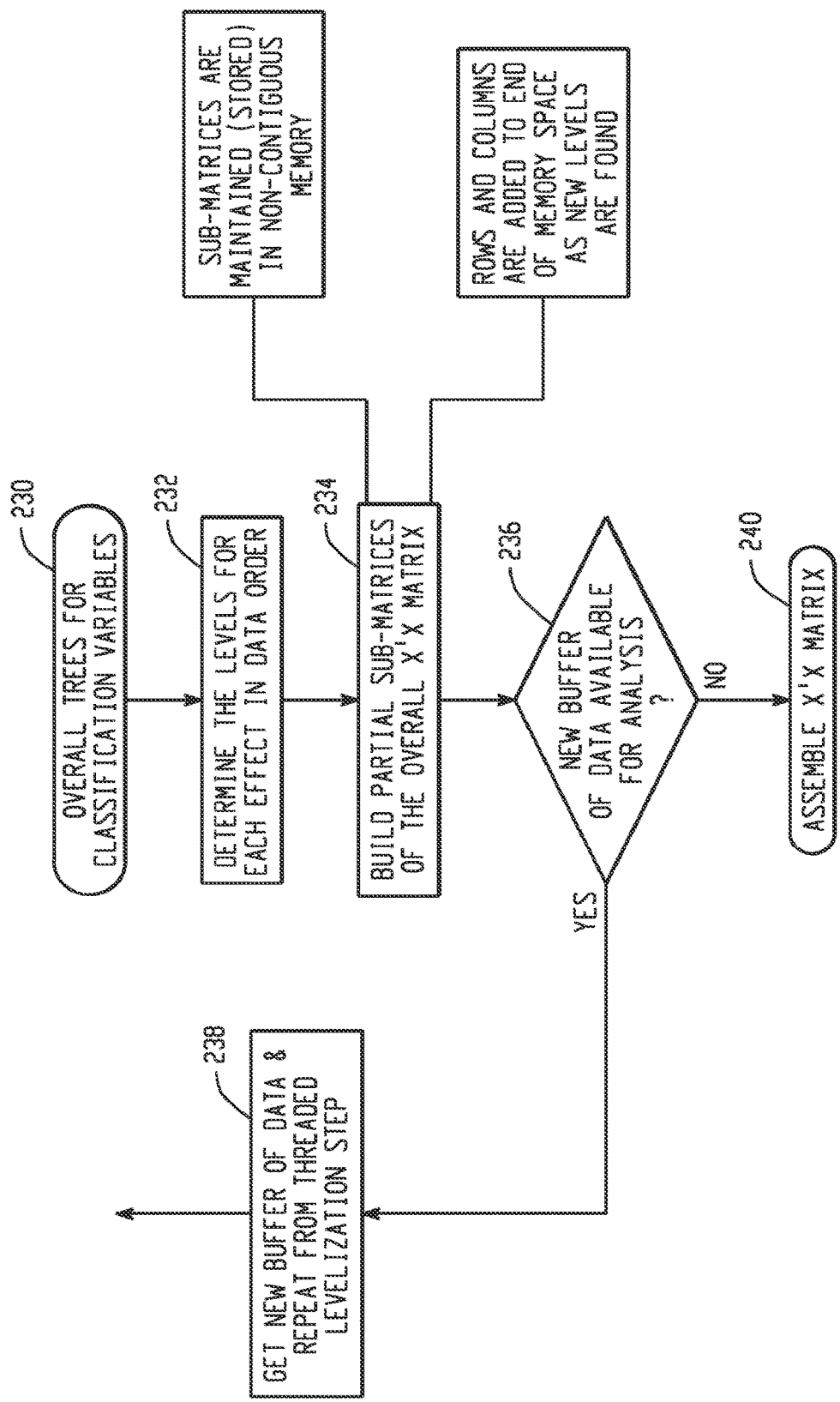
FIG. 8 is a process flow diagram depicting an example operational scenario involving a data processing system for performing effect levelization.

FIG. 8 depicts an example process for performing effect levelization. The overall trees for each classification variable (230) generated by the variable tree merge software component are used to determine the levels for each effect (step 232). Because the variable levels were organized by the order in which they appeared in the data, the effect levels will also be organized by the order in which they appear in the data (step 232). In addition to determining the levels for each effect in data order, partial sub-matrices of the overall X'X matrix are constructed (step 234).

Each of the sub-matrices are stored separately in memory and as additional levels are found in the data, new rows and columns can be added to the end of the used memory space allocated to the sub-matrices. For example, a sub-matrix C may be a 3×3 matrix after processing a certain number of observations and becomes a 4×4 matrix after processing the next observation. The information added to the $4^{th}$ row and $4^{th}$ column are stored in the memory space allocated to the sub-matrix C after the information that makes up the first three rows and columns in sub-matrix C. By storing the sub-matrices in separate memory, the sub-matrices are allowed to grow as additional levels are detected in the data.

The partial sub-matrices can be assembled as illustrated in the following example. If, for example, there are three effects in a model, $E_1$, $E_2$, and $E_3$, the X'X matrix can be constructed from six sub-matrices in accordance with the following table:

$$X'X = \begin{bmatrix} X'_{E1}X_{E1} & & \\ X'_{E1}X_{E2} & X'_{E2}X_{E2} & \\ X'_{E1}X_{E3} & X'_{E2}X_{E3} & X'_{E3}X_{E3} \end{bmatrix}$$

Even if the effects are in data order, the position of the diagonal sub-matrix for $X'_{E2}X_{E2}$ cannot be determined without knowing the dimension of the $X'_{E1}X_{E2}$ sub-matrix (or at least without knowing the number of levels in effect $E_1$). However, if the variable and effect levels are in data order, a new level of effect $E_2$ will lead to the addition of a new row/column at the end of the $X'_{E2}X_{E2}$ sub-matrix. The effect levelization software component maintains the sub-matrices of the X'X table in non-contiguous memory and adds rows and columns to the end as new levels are encountered. In one embodiment, the sub-matrices are sparse and the effect levelization software component causes the sub-matrices to be stored sparsely in such a way that the memory can be easily grown, for example, by maintaining rows of symmetric or rectangular matrices in balanced binary sub-trees.

After the partial sub-matrices have been constructed, a check is made to determine if a new buffer of data is available for analysis (step 236). If a new buffer of data is received the process begins again with the threaded levelization of the variables (step 238). If it is determined that all data has been received, the X'X matrix can be assembled in a multi-step process (step 240).

Figure 9:
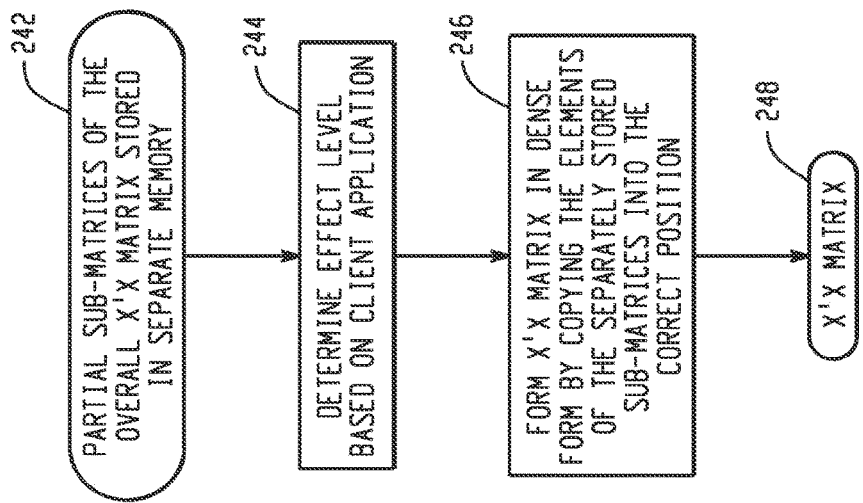
FIG. 9 is a process flow diagram depicting an example operational scenario involving a data processing system for assembling a cross-product matrix.

Illustrated in FIG. 9 is an example process for assembling an X'X matrix from the partial sub-matrices. In this process, the elements of the partial sub-matrices (242) generated by the effect levelization process are reordered. This involves determining the effect level ordering based on a request by the client application that initiated the data analysis (step 244) and reordering the levels of the classification variables and the effects to comply with the requested ordering specified by the client application. If the client application requested that variables be arranged in data order, then reordering is not necessary. If, however, the client application specified a different ordering, the variable trees and the effect trees must be suitably re-arranged to match the specified order.

With the variable and effect levels remapped, at step 246, the X'X matrix 248 is formed in dense form by copying elements of the sub-matrices into the correct level-order position of the overall X'X matrix. As a result, the X'X matrix can be formed in one pass through the data in the data buffer. As an alternative to step 246, the X'X matrix 248 could be assembled into a sparse matrix using any number of methods for sparse matrix representation.

Figure 10:
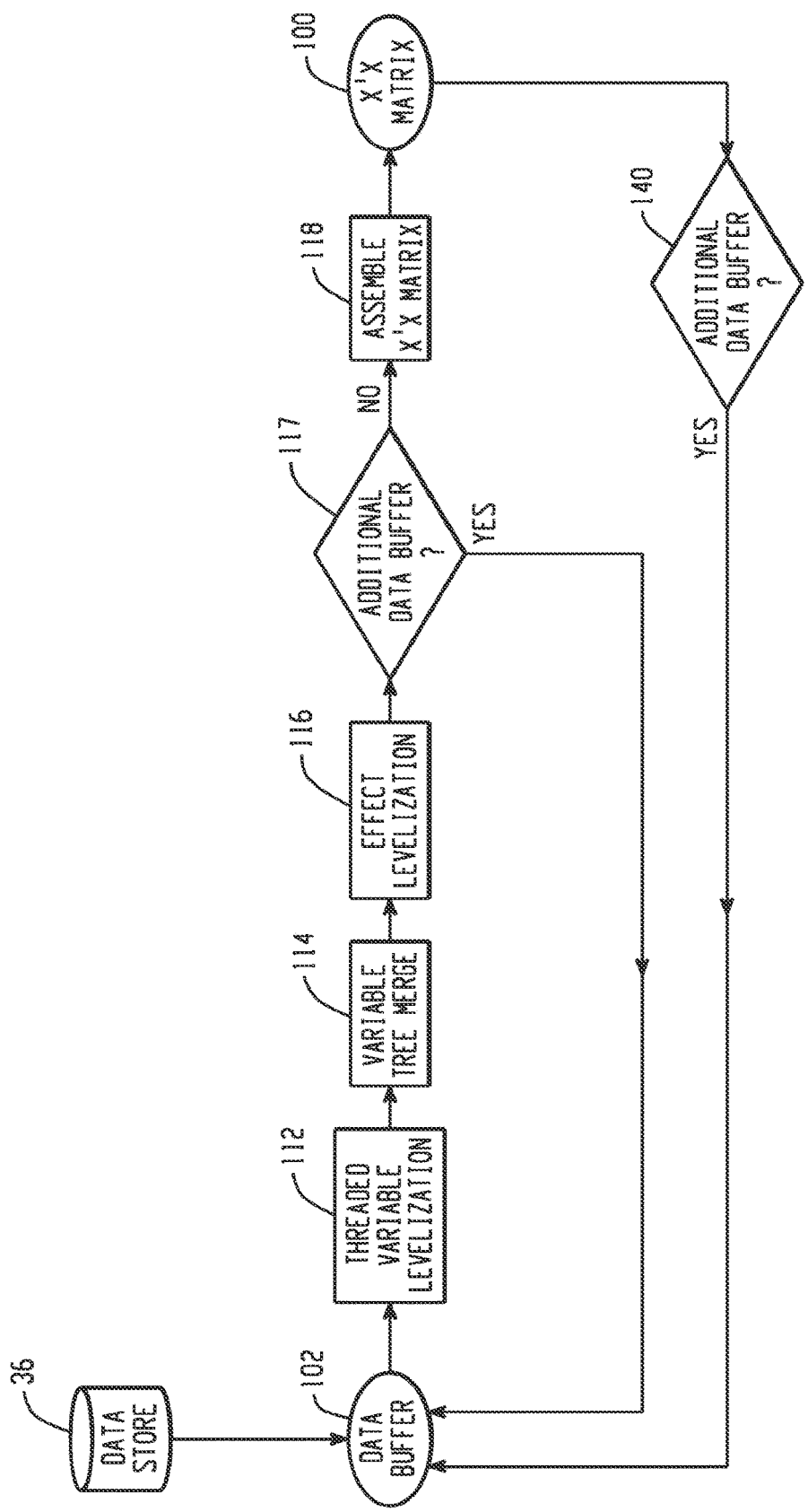
FIGS. 10-11 are block diagrams depicting example hardware and software components of data processing systems for continuously generating a cross-product matrix as data are streamed.
Figure 11:
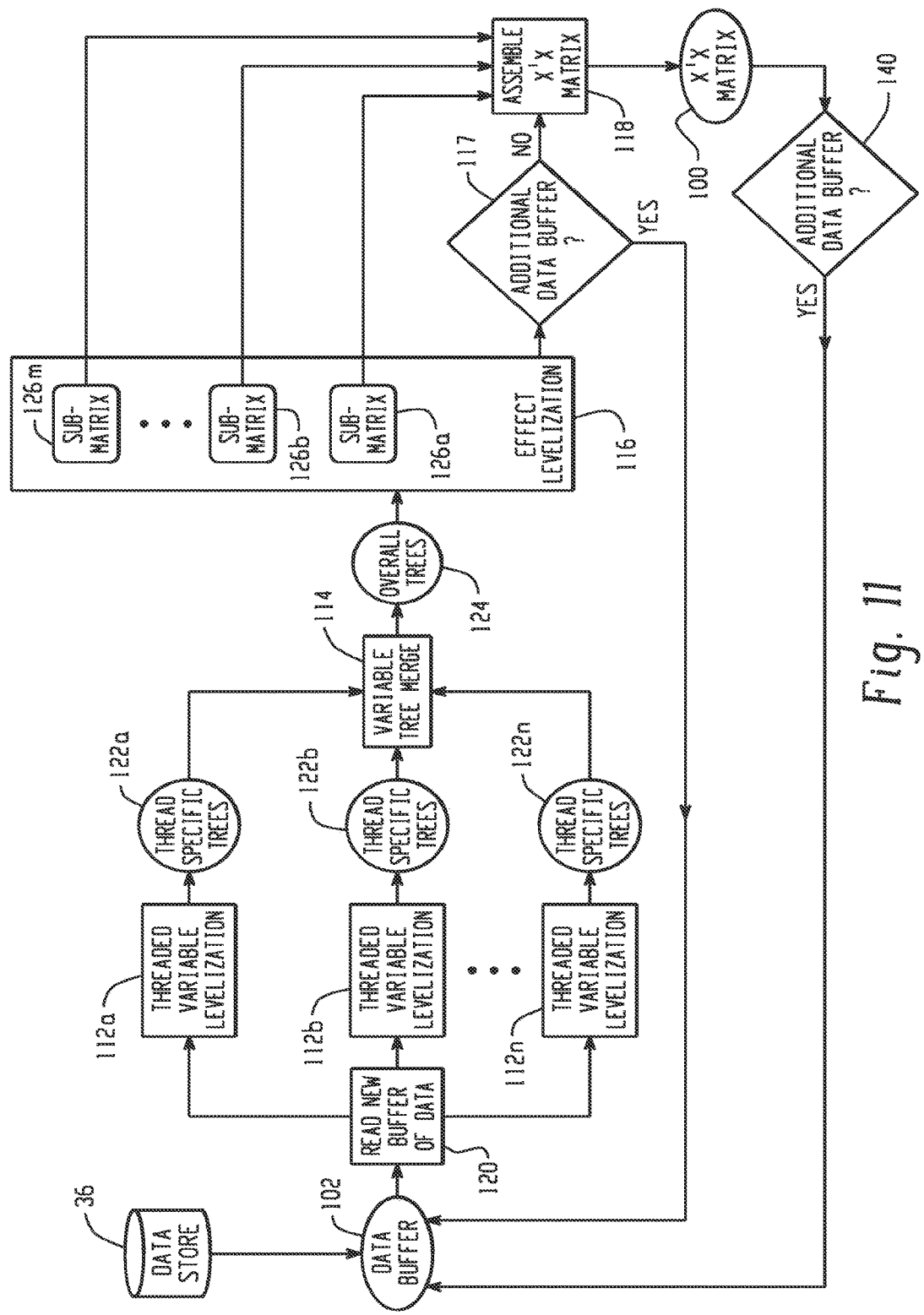

FIGS. 10 and 11 depict additional example systems for forming an X'X matrix in a single pass through data. In these examples, data may be streamed to the system. The system can generate an X'X matrix in a manner similar to that described in the prior examples. The example systems of FIGS. 10 and 11, additionally, can re-compute the X'X matrix if additional data are received after the X'X matrix is initially generated.

These example systems have instructions 140 that cause these systems to periodically check for new data in the data buffer 102. If new data are found, the new data are read, the thread specific trees are updated, the overall trees are updated and the sub-matrices previously generated are updated. Because the sub-matrices formed in the effect levelization process are maintained in non-contiguous memory spaces and the levels are maintained in data order, as new data are processed, the rows and columns of the sub-matrices can be updated and new rows and columns can be added to the end to reflect the new data. After the sub-matrices are updated, the elements of the partial sub-matrices are reordered, if necessary. With the variable and effect levels remapped, the X'X matrix 100 is re-formed in dense or sparse form by copying elements of the sub-matrices into the correct level-order position in the overall X'X matrix. As a result, the X'X matrix 100 can continuously be re-formed in a single pass as new data are streamed to the data buffer 102.

Figure 12:
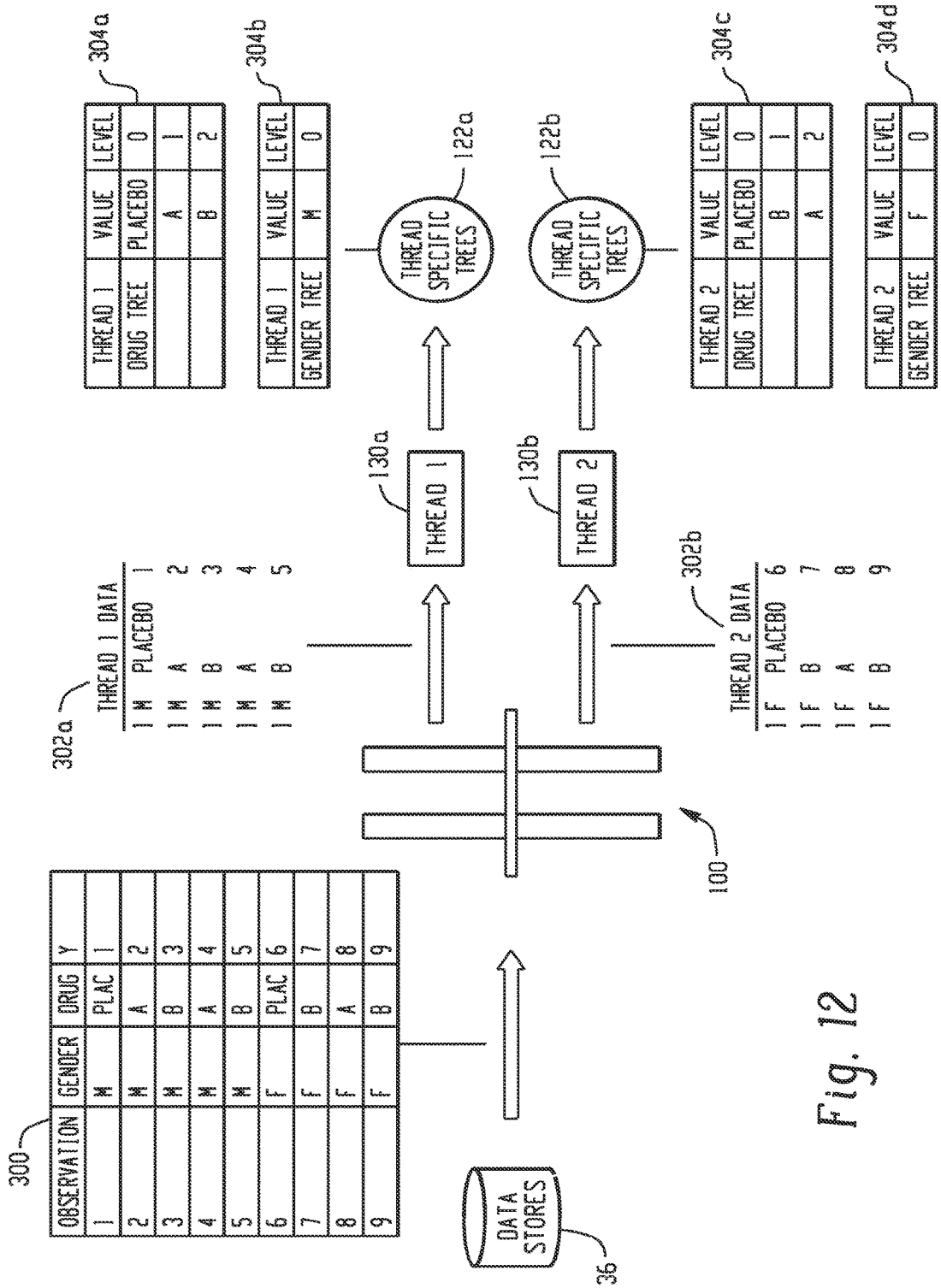
FIG. 12 is a block diagram depicting example hardware components and example data flow in a data processing system that performs variable levelization.

FIG. 12 depicts an example data flow in a threaded variable levelization process. As illustrated, an example table 300 containing nine observations are provided to the buffer memory 100. The nine observations include data relating to the classification variables Gender and Drug, and a response variable (Y). The nine observations in this example are allocated to two threads. The first five observations are allocated to the first thread as show at 302a and the last four observations are allocated to the second thread as shown at 302b. In this example, thread 1 handles all of the observations with Gender="M", and thread 2 handles all of the observations for Gender="F". A model intercept, which has been added in this example, is represented by a column of "1".

When the threaded variable levelization process is applied, each thread generates a drug tree and a gender tree from the observations assigned to it as illustrated at 304a-d. The level encoding is separate for each thread and the order of the levels for each thread is the order in which the levels were encountered by the particular thread. The tables shown at 304a-d represent the information that is stored and managed in binary trees by the code.

Figure 13:
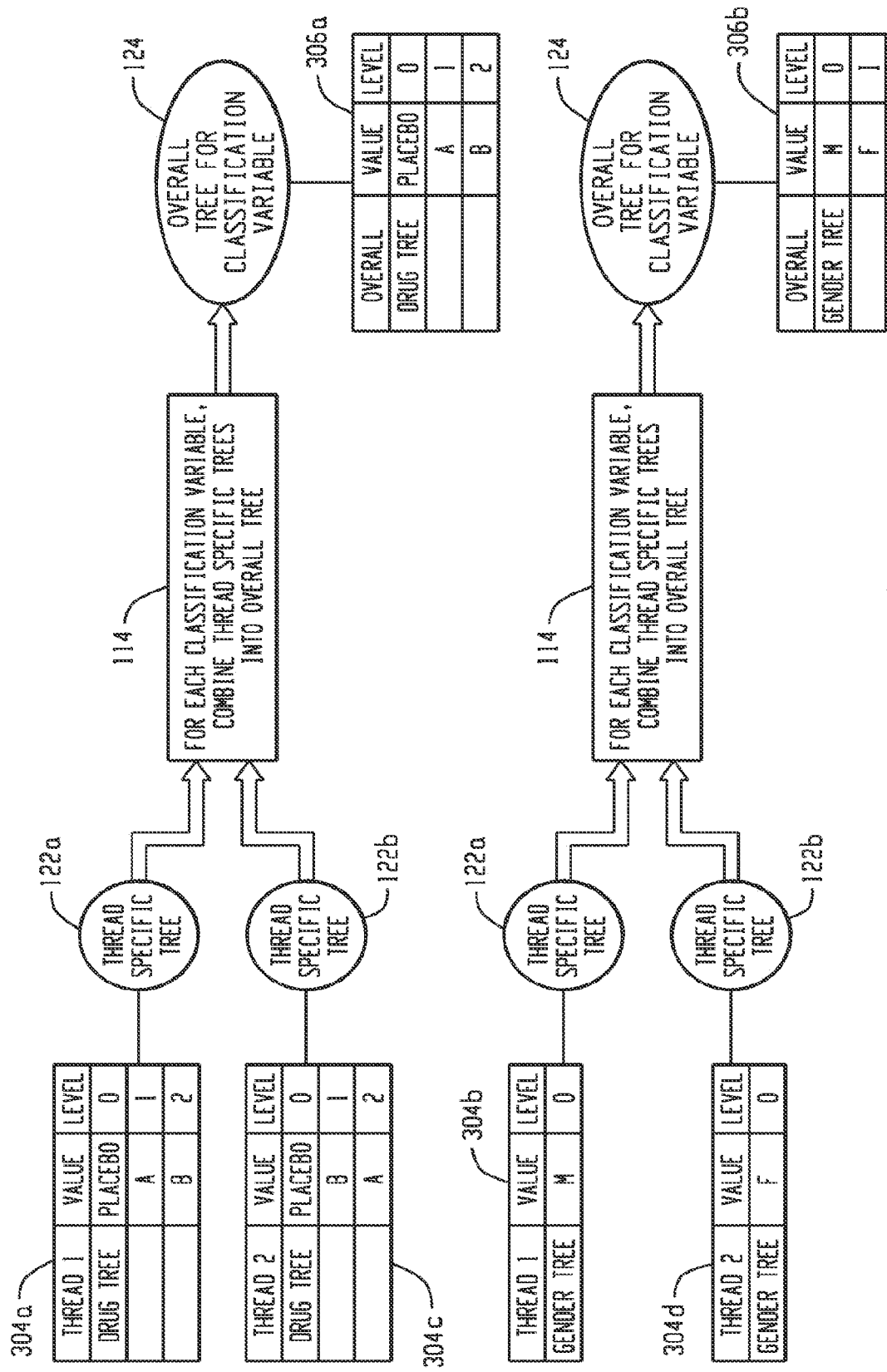
FIG. 13 is a process flow diagram depicting an example data flow in a process for merging analysis performed by two computing threads.

After the threaded variable levelization process, the thread-specific trees 304a-d are merged into one overall tree 306 a-b for each classification variable as illustrated in FIG. 13. The order for the levels in the overall trees 306 a-b is in data order with respect to the entire data set. In this example, the two threads assigned a different level for the value "A" of the Drug variable. Because the "A" value had a lower observation number in thread 1 than the "B" value in thread 2, the value "A" was assigned to a lower level in the overall tree for the Drug variable.

Figure 14:
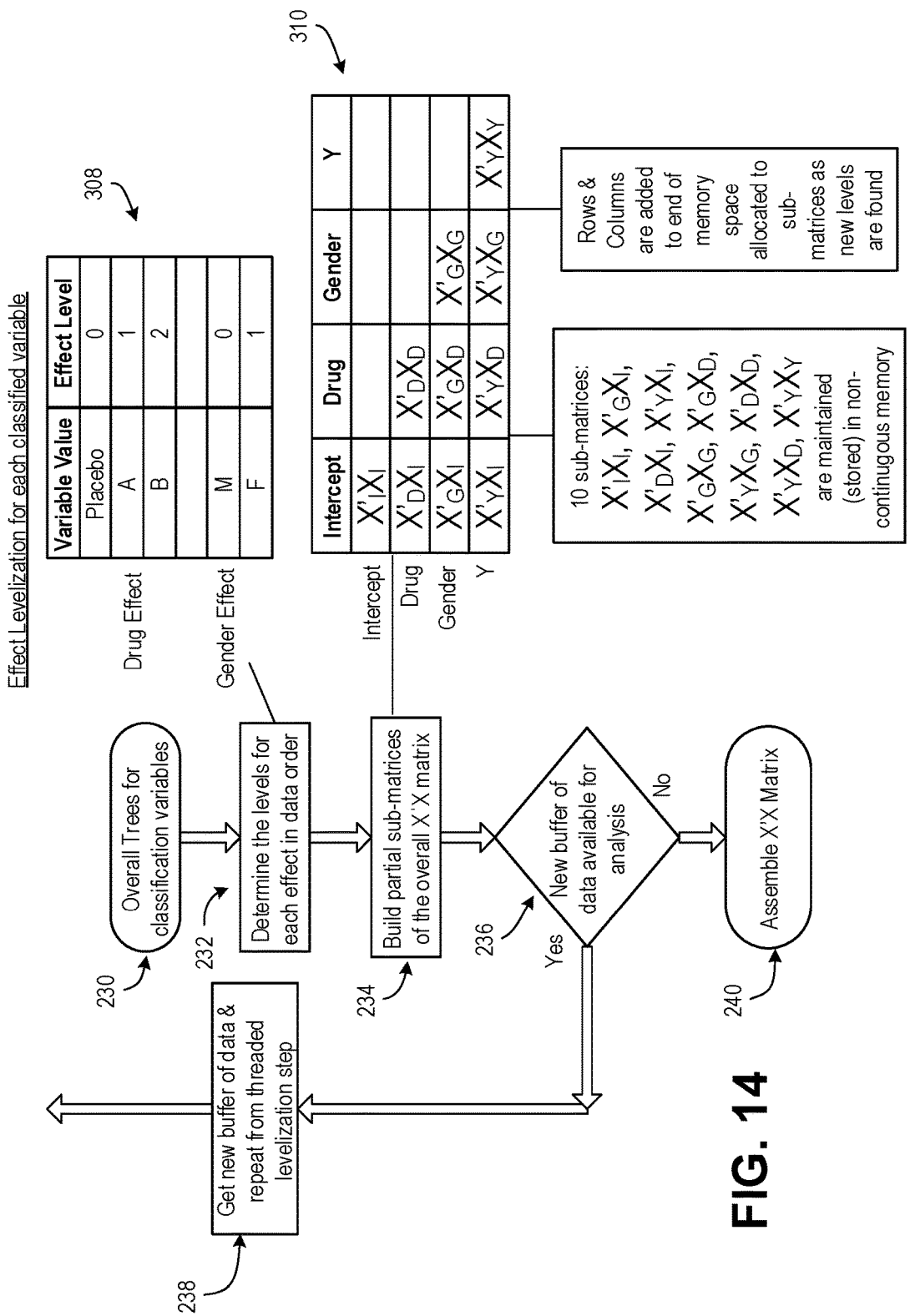
FIGS. 14-15 are process flow diagrams depicting an example data flow in a process for performing effect levelization.
Figure 15:
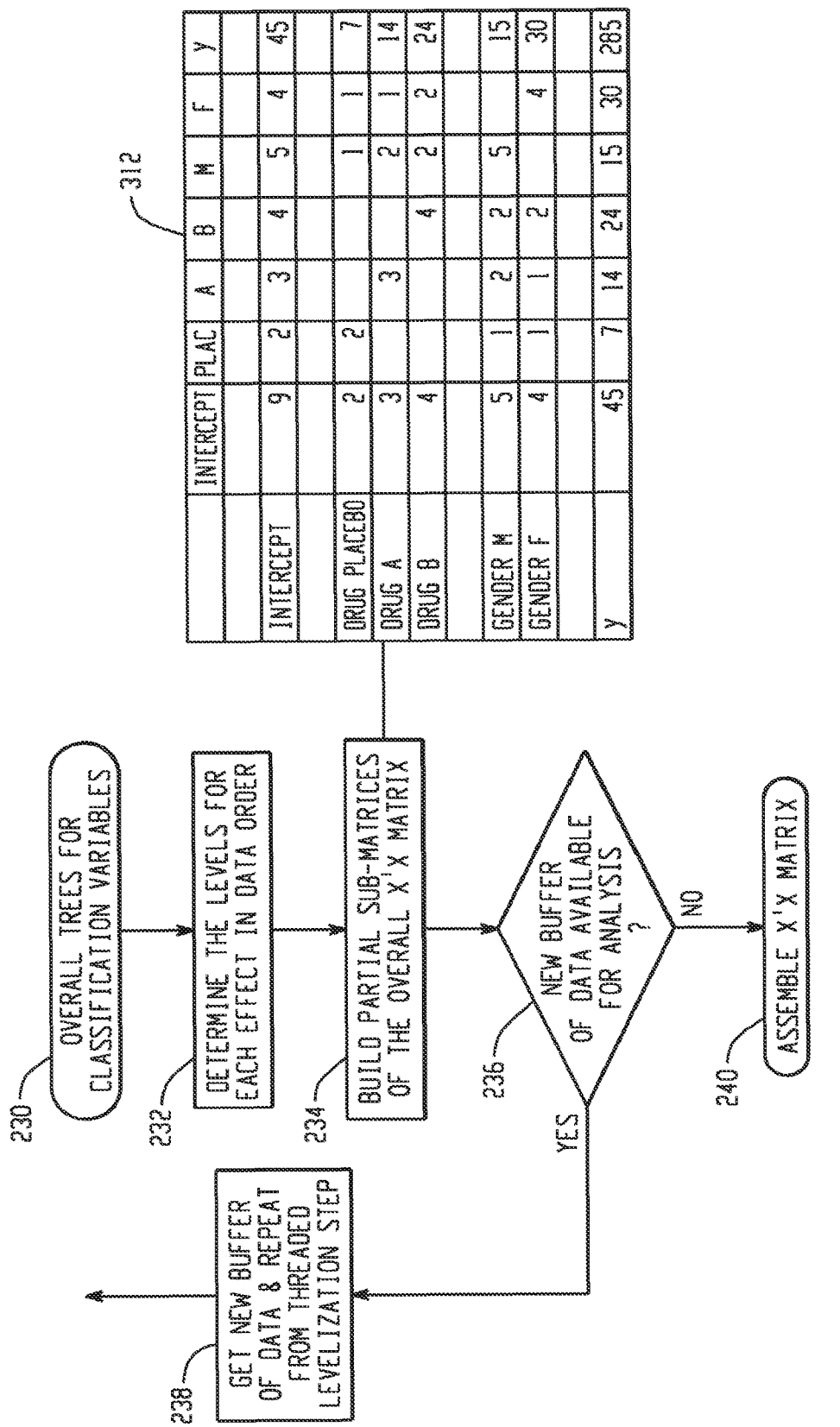

FIGS. 14 and 15 continue the example data flow through the effect levelization stage. The effect trees generated in the effect levelization process, in this example, have the same number of levels as the variable trees as illustrated at 308. Because there are four effects—Intercept, Gender, Drug, and Y—in this example (see 310), an X'X matrix can be generated from 10 sub-matrices: $X'_1X_1$, $X'_GX_1$, $X'_DX_1$, $X'_YX_1$, $X'_GX_G$, $X'_DX_G$, $X'_GX_G$, $X'_DX_D$, $X'_YX_D$, $X'_YX_Y$ (as illustrated at 310) which occupy the locations in X'X matrix specified at 310.

These 10 sub-matrices are generated in non-contiguous memory to allow them to grow as needed. Each of the 10 sub-matrices is generated using the variable and effect levelization trees and the 9 observations. Based on the 9 observations in this example, the dimensions for each sub-matrix is as follows: $X'_1X_1$=[1×1], $X'_DX_1$=[3×1], $X'_GX_1$=[2×1], $X'_YX_1$=[1×1], $X'_DX_D$=[3×3], $X'_GX_D$=[2×3], $X'_YX_D$=[1×3], $X'_GX_G$=[2×2], $X'_YX_G$=[1×2], and $X'_YX_Y$=[1×1].

For each of the 9 observations, its contributions to the various sub-matrices are accumulated. If additional levels are detected from later observations, the sub-matrices can be expanded because they are stored in non-contiguous memory to allow more rows and columns to be added as needed when new levels of an effect are detected. If the sub-matrices were "concatenated" into one contiguous chunk of memory, it would result in the X'X matrix in data order shown at 312.

Figure 16:
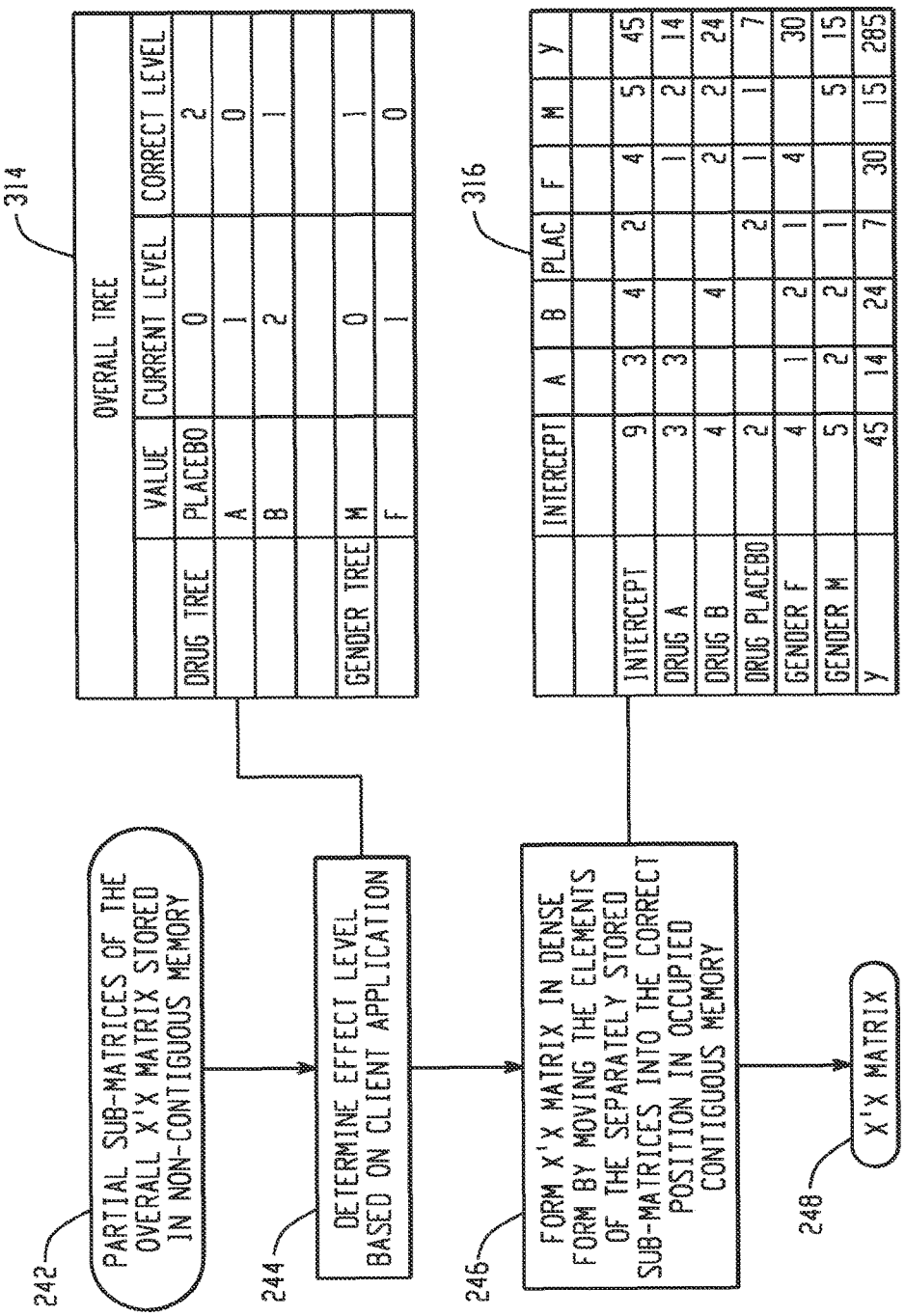
FIG. 16 is a process flow diagram depicting an example data flow in a process for assembling a cross-product matrix.

If no new data are available for analysis, the final X'X can be constructed in contiguous memory. As illustrated in FIG. 16, the effect levels must be determined based on the order specified by the client application (step 244). In this example the correct order of the class variable levels is provided in the last column of the table at 314.

In this example, the model contains only main effects (no interactions) and the effect level ordering is the same as the variable ordering. After allocating a sufficient block of memory to hold the X'X matrix (the size based on all previously seen data is now known), the elements of the sub-matrices are permuted into the correct location within the X'X matrix as shown in the example at 316. Thus, an X'X matrix can be generated as illustrated by the aforementioned examples.

This written description uses examples to disclose the invention, including the best mode, and also to enable a person skilled in the art to make and use the invention. The patentable scope of the invention may include other examples.

For example, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method, comprising:
   using multiple threads to generate a cross-product matrix in a single pass through data, wherein the data is associated with at least one classification variable, wherein the cross-product matrix is stored in contiguous memory, and wherein generating the cross-product matrix includes:
   receiving the data, wherein receiving includes storing the data in memory;
   associating each of the multiple threads with a unique portion of the memory in which the data is stored;
   generating multiple binary trees with respect to each of the at least one classification variable, wherein each of the binary trees is generated by a different one of the multiple threads, and wherein each binary tree is associated with observations in the portion of memory associated with the thread which generated that binary tree;
   forming a combined tree for each of the at least one classification variable, wherein forming the combined tree includes combining the multiple binary trees generated with respect to the classification variable;
   generating partial sub-matrices of the cross-product matrix using the combined trees, wherein generating includes storing the sub-matrices in non-contiguous memory to facilitate growing the sub-matrices in the single pass, and wherein generating the partial sub-matrices includes dynamically growing the sub-matrices according to the combined trees; and
   ordering elements of the sub-matrices in the contiguous memory; and
   generating a model using the cross-product matrix.

2. The method of claim 1, further comprising:
   receiving additional data; and
   updating the binary trees generated with respect to each of the at least one classification variable, wherein updating is based on the additional data.

3. The method of claim 2, further comprising:
   updating the combined tree for each of the at least one classification variable, wherein the combined trees is based on the updated binary trees.

4. The method of claim 3, further comprising:
   updating the sub-matrices based on the updated combined trees; and
   updating the cross-product matrix based on the updated sub-matrices, wherein, after being updated, the cross-product matrix reflects the additional data.

5. The method of claim 4, wherein after being updated, the sub-matrices are sparse.

6. The method of claim 5, wherein, after being updated, the cross-product matrix is sparse.

7. The method of claim 1, wherein the binary trees describe characteristics of the at least one classification variable.

8. The method of claim 1, further comprising:
   performing effect levelization on the data, wherein multiple threads are used to perform the effect levelization.

9. The method of claim 1, wherein each of the multiple threads executes instructions for generating one of the partial sub-matrices.

10. The method of claim 1, wherein the cross-product matrix is a dense cross-product matrix.

11. The method of claim 1, wherein generating the partial sub-matrices includes generating the partial sub-matrices as sparse sub-matrices.

12. The method of claim 1, wherein at least one of the partial sub-matrices is a sparse sub-matrix.

13. The method of claim 1, wherein the cross-product matrix is a sparse cross-product matrix.

14. A computer-implemented system, the system comprising:
   memory storage containing a plurality of memory spaces, wherein the memory storage includes a data buffer for accepting data;
   a processor having a plurality of executable threads, the processor being coupled to the memory storage and configured to perform operations including:
   using the multiple threads to generate a cross-product matrix in a single pass through the data, wherein the data is associated with at least one classification variable, wherein the cross-product matrix is stored in contiguous memory spaces, and wherein generating the cross-product matrix includes:

receiving the data, wherein receiving includes storing the data in the data buffer;
associating each of the multiple threads with a unique portion of the memory in which the data is stored;
generating multiple binary trees with respect to each of the at least one classification variable, wherein each of the binary trees is generated by a different one of the multiple threads, and wherein each binary tree is associated with observations in the portion of memory associated with the thread which generated that binary tree;
forming a combined tree for each of the at least one classification variable, wherein forming the combined tree includes combining the multiple binary trees generated with respect to the classification variable;
generating partial sub-matrices of the cross-product matrix using the combined trees, wherein generating includes storing the sub-matrices in non-contiguous memory spaces to facilitate growing the sub-matrices in the single pass, and wherein generating the partial sub-matrices includes dynamically growing the sub-matrices according to the combined trees; and
ordering elements of the sub-matrices in the contiguous memory spaces; and
generating a model using the cross-product matrix.

15. The computer-implemented system of claim 14, wherein the binary trees describe characteristics of the at least one classification variable.

16. The computer-implemented system of claim 14, wherein the operations further include:
performing effect levelization on the data, wherein multiple threads are used to perform the effect levelization.

17. The computer-implemented system of claim 14, wherein each of the multiple threads executes instructions for generating one of the partial sub-matrices.

18. The computer-implemented system of claim 14, wherein the cross-product matrix is a dense cross-product matrix.

19. The computer-implemented system of claim 14, wherein the operations further include:
receiving additional data; and
updating the binary trees generated with respect to each of the at least one classification variable, wherein updating is based on the additional data.

20. The computer-implemented system of claim 19, wherein the operations further include:
updating the combined tree for each of the at least one classification variable, wherein the combined trees is based on the updated binary trees.

21. The computer-implemented system of claim 20, wherein the operations further include:
updating the sub-matrices based on the updated combined trees; and
updating the cross-product matrix based on the updated sub-matrices, wherein, after being updated, the cross-product matrix reflects the additional data.

22. The computer-implemented system of claim 21, wherein after being updated, the sub-matrices are sparse.

23. The computer-implemented system of claim 22, wherein, after being updated, the cross-product matrix is sparse.

24. The computer-implemented system of claim 14, wherein generating the partial sub-matrices includes generating the partial sub-matrices as sparse sub-matrices.

25. The computer-implemented system of claim 14, wherein at least one of the partial sub-matrices is a sparse sub-matrix.

26. The computer-implemented system of claim 14, wherein the cross-product matrix is a sparse cross-product matrix.

27. A computer-program product, the computer-program product including a non-transitory computer-readable medium, the medium having instructions stored thereon, and the instructions for causing a computing device to perform operations including:
using multiple threads to generate a cross-product matrix in a single pass through data, wherein the data is associated with at least one classification variable, wherein the cross-product matrix is stored in contiguous memory, and wherein generating the cross-product matrix includes:
receiving the data, wherein receiving includes storing the data in memory;
associating each of the multiple threads with a unique portion of the memory in which the data is stored;
generating multiple binary trees with respect to each of the at least one classification variable, wherein each of the binary trees is generated by a different one of the multiple threads, and wherein each binary tree is associated with observations in the portion of memory associated with the thread which generated that binary tree;
forming a combined tree for each of the at least one classification variable, wherein forming the combined tree includes combining the multiple trees generated with respect to the classification variable;
generating partial sub-matrices of the cross-product matrix using the combined trees, wherein generating includes storing the sub-matrices in non-contiguous memory to facilitate growing the sub-matrices in the single pass, and wherein generating the partial sub-matrices includes dynamically growing the sub-matrices according to the combined trees; and
ordering elements of the sub-matrices in the contiguous memory; and
generating a model using the cross-product matrix.

28. The computer-program product of claim 27, wherein the operations further include:
performing effect levelization on the data, wherein multiple threads are used to perform the effect levelization.

29. The computer-program product of claim 27, wherein the operations further include:
receiving additional data; and
updating the binary trees generated with respect to each of the at least one classification variable, wherein updating is based on the additional data.

30. The computer-program product of claim 29, wherein the operations further include:
updating the combined tree for each of the at least one classification variable, wherein the combined trees is based on the updated binary trees.

31. The computer-program product of claim 30, wherein the operations further include:
updating the sub-matrices based on the updated combined trees; and
updating the cross-product matrix based on the updated sub-matrices, wherein, after being updated, the cross-product matrix reflects the additional data.

32. The computer-program product of claim 31, wherein after being updated, the sub-matrices are sparse.

33. The computer-program product of claim 32, wherein, after being updated, the cross-product matrix is sparse.

34. The computer-program product of claim 27, wherein the binary trees describe characteristics of the at least one classification variable.

35. The computer-program product of claim 27, wherein each of the multiple threads executes instructions for generating one of the partial sub-matrices.

36. The computer-program product of claim 27, wherein the cross-product matrix is a dense cross-product matrix.

37. The computer-program product of claim 27, wherein generating the partial sub-matrices includes generating the partial sub-matrices as sparse sub-matrices.

38. The computer-program product of claim 27, wherein at least one of the partial sub-matrices is a sparse sub-matrix.

39. The computer-program product of claim 27, wherein the cross-product matrix is a sparse cross-product matrix.

* * * * *